United States Patent
Gupta et al.

(10) Patent No.: US 8,275,762 B2
(45) Date of Patent: Sep. 25, 2012

(54) REVERSE MAPPING OF FEATURE SPACE TO PREDICT EXECUTION IN A DATABASE

(75) Inventors: Chetan Kumar Gupta, Austin, TX (US); Archana Sulochana Ganapathi, Palo Alto, CA (US); Harumi Anne Kuno, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 12/255,613

(22) Filed: Oct. 21, 2008

(65) Prior Publication Data
US 2010/0114865 A1 May 6, 2010

(51) Int. Cl.
*G06F 17/30* (2006.01)
(52) U.S. Cl. ........ 707/713; 707/718; 707/719; 707/720; 707/721
(58) Field of Classification Search .................. 707/713, 707/718, 719, 720, 721
See application file for complete search history.

(56) References Cited

U.S. PATENT DOCUMENTS

| | | | | |
|---|---|---|---|---|
| 5,835,964 A * | 11/1998 | Draves et al. | ................ | 711/207 |
| 6,003,022 A * | 12/1999 | Eberhard et al. | ..................... | 1/1 |
| 6,026,391 A * | 2/2000 | Osborn et al. | ........................ | 1/1 |
| 6,799,175 B2 * | 9/2004 | Aggarwal | ............................ | 1/1 |
| 7,356,524 B2 * | 4/2008 | Zurek et al. | ................... | 707/720 |
| 7,398,191 B1 * | 7/2008 | Gluhovsky et al. | ............... | 703/2 |
| 7,636,735 B2 * | 12/2009 | Haas et al. | ............................ | 1/1 |
| 7,747,641 B2 * | 6/2010 | Kim et al. | ..................... | 707/769 |
| 7,831,594 B2 * | 11/2010 | Mehta et al. | ................... | 707/721 |
| 7,895,192 B2 * | 2/2011 | Mehta et al. | ................... | 707/719 |
| 2002/0147703 A1 * | 10/2002 | Yu et al. | ........................... | 707/2 |
| 2002/0169772 A1 * | 11/2002 | Aggarwal | ........................ | 707/6 |
| 2004/0162834 A1 * | 8/2004 | Aono et al. | ..................... | 707/100 |
| 2005/0071331 A1 * | 3/2005 | Gao et al. | ........................... | 707/4 |
| 2005/0222965 A1 * | 10/2005 | Chaudhuri et al. | ............... | 707/1 |
| 2005/0228779 A1 * | 10/2005 | Chaudhuri et al. | ............... | 707/3 |
| 2006/0230006 A1 * | 10/2006 | Buscema | ........................ | 706/13 |
| 2007/0217676 A1 * | 9/2007 | Grauman et al. | ............. | 382/170 |
| 2007/0226178 A1 * | 9/2007 | Ewen et al. | ........................ | 707/2 |
| 2007/0250476 A1 * | 10/2007 | Krasnik | ........................ | 707/2 |
| 2007/0255512 A1 * | 11/2007 | Delenstarr et al. | .............. | 702/35 |
| 2008/0195577 A1 * | 8/2008 | Fan et al. | ........................... | 707/2 |
| 2008/0253665 A1 * | 10/2008 | Mitarai et al. | ................. | 382/227 |
| 2009/0006045 A1 * | 1/2009 | Liu et al. | ............................ | 703/2 |
| 2009/0024563 A1 * | 1/2009 | Sengar | ............................... | 707/2 |
| 2009/0024598 A1 * | 1/2009 | Xie et al. | ........................... | 707/4 |
| 2009/0319475 A1 * | 12/2009 | Bestgen et al. | .................... | 707/2 |
| 2010/0082599 A1 * | 4/2010 | Graefe et al. | ................. | 707/713 |
| 2010/0082602 A1 * | 4/2010 | Ganapathi et al. | ............. | 707/718 |

* cited by examiner

Primary Examiner — Thanh-Ha Dang (57) ABSTRACT

One embodiment is a method that generates points from an input space obtained from a query for a database. A kernel function maps the points from the input space to a feature space. Given a point in the feature space, a reverse mapping identifies coordinates in the input space for the point to predict performance of the query before the query executes in the database.

14 Claims, 7 Drawing Sheets

REVERSE MAPPING OF FEATURE SPACE TO PREDICT EXECUTION IN A DATABASE

CROSS-REFERENCE TO RELATED APPLICATIONS

This application relates to commonly assigned U.S. patent applications 61/078,379 entitled "Predicting Performance of Executing a Query in Isolation in a Database" and filed on Jul. 5, 2008; 61/078,380 entitled "Characterizing Queries to Predict Execution in a Database" and filed on Jul. 5, 2008; 61/078,381 entitled "Predicting Performance of Multiple Queries Executing in a Database" and filed on Jul. 5, 2008; 61/078,382 entitled "Managing Execution of Database Queries" and filed on Jul. 5, 2008, all of which are incorporated herein by reference.

BACKGROUND

Business Intelligence (BI) database systems process extremely complex queries upon massive amounts of data. This capability is important to modern enterprises, which rely upon the collection, integration, and analysis of an expanding sea of information.

In BI databases, it is quite difficult to predict in advance the performance characteristics (execution time, resource usage and contention, etc.) of executing a business intelligence workload on a given database system configuration, especially when the workload is executed in multiple streams. Enormous amounts of data are stored in the database, and large variances exist in the amount of data processed for each query. Furthermore, predicting the exact amount of data that will be processed for a given query is challenging. Variances in the times needed to execute individual queries can cause wait time to significantly outweigh execution time for a given query. Such variances add to the difficulty in estimating the time needed to execute a query that will run at the same time as other unknown queries.

Database designers can realize many business benefits if they can accurately predict performance of executing queries in a database. By way of example, database designers can more efficiently design a database system for running workloads of customers. Such databases can more accurately be selected with respect to size, capacity, performance, management, and cost, to name a few examples.

DETAILED DESCRIPTION

Exemplary embodiments in accordance with the present invention are directed to systems and methods for predicting the performance characteristics of executing a database workload. One embodiment determines the pre-image of a feature vector in a kernel-induced feature space for applications with an enumerable or countable set of points in the input space. Given an input space, a feature space, and a kernel function for mapping from the input space to the feature, exemplary embodiments provides a system and method for performing a reverse mapping from the target feature space to the target input space.

Exemplary embodiments can be applied to a variety of domains that use machine learning to predict the performance of a system based on some characterization of the system. One embodiment pertains to the management of database systems by estimating the performance characteristics of executing a database workload's queries on a given instance of a database system prior to actually performing the workload. One approach to predicting the performance of a database workload is to use machine learning techniques (MLTs) to develop characterization and correlation functions in such a way that the similarity between the characterizations of two workloads correlates to the similarity between those same two workloads' performance characteristics.

One embodiment uses machine learning techniques (MLTs) to correlate a point in a source input space to a corresponding point in a target feature space and to identify the corresponding coordinates in the target input space. Unlike other domains, such as pattern de-noising, the feature space of system performance is bounded by the capabilities of the system.

Exemplary embodiments enable systems and methods to provide a reverse mapping from the target feature space to the target input space. This reverse mapping is performed given the following input: (1) a source input space and a source feature space, (2) a target input space and a target feature space, and (3) kernel functions for mapping from the source input to the source feature space. The kernel functions also map from the target input space to the target feature space in such a way that points that are co-located in the source feature space are likely to be co-located in the target feature space.

In one embodiment, a database workload is characterized based on an analysis of the query plans of the workload. This characterization is determined in terms of the performance characteristics of the algorithms used to implement the operators that make up the query plan. The resource requirements and performance characteristics of the workload are modeled to reflect how performance changes according to a variety of parameters, including accuracy of cardinality predictions, amount of available memory, resource contention, etc.

One embodiment creates a characterization of the performance features of running the queries that comprise the workload in isolation. A machine learning algorithm then creates a characterization function for encoding these characteristics into a workload characterization feature space, a characterization function for encoding workload performance characteristics into a performance features space, and a collocation function. Given any point within the workload characteristics feature space, exemplary embodiments can find the corresponding location in the query performance feature space.

The characterization and collocation functions are created so as to support a maximum correlation between locations in the workload characterization and performance features spaces. As such the resource requirements (execution time, resource usage, resource contention, etc.) are estimated for executing business intelligence (BI) workloads on a given database system configuration.

One embodiment is illustrated with the following hypothetical example: Consider a business whose data warehouse now has one hundred times as much data as it had at installation. Queries that used to run in an hour now take days, e.g., to produce monthly global financial results. This business needs a bigger database system configuration: more CPUs, more memory, etc. The business desires to determine how much bigger its database should be expanded. Performance does not scale linearly with system size and is highly dependent on the mix of queries and data that comprise a given workload.

In this hypothetical example, if a new database system is too small, performance will not improve enough and the database will not meet the needs of the customer. On the other hand, if the new system is too powerful, then performance will improve, but the price of the new database system could be greater than a system that more efficiently met the needs of the customer. Further, the new system could be both too expensive and also inappropriate for the customer's workload. For example, purchasing one hundred times more disks and partitioning data across them will not help if poor performance is actually due to insufficient CPU resources.

Exemplary embodiments will enable a user (such as database vendor) to recommend a new system to the business customer of the hypothetical example so the database is neither too large nor too small. Exemplary embodiments predict query and workload performance and resource use so both businesses and database vendors can decide which system configuration meets the needs of the customer.

Prediction methods in accordance with exemplary embodiments support both the initial system sizing problem (for example, which system configuration to buy? what is the minimum amount to spend for satisfactory performance?) and the capacity planning problem (for example, what will happen to performance as more data is added?). These problems are of interest both to database customers and to database system vendors. Furthermore, exemplary embodiments provide good query and workload predictions so users know when their queries will finish, without requiring them to know what else is running in the system.

One embodiment applies a methodology that accurately predicts multiple performance metrics (including elapsed time and resource requirements, such as CPU time, memory usage characteristics, disk I/Os, and number of messages) simultaneously. Performance predictions can be made for different numbers of executing queries. For example, one embodiment predicts the performance of individual queries running in isolation, based only on their query plans, which are available before runtime. The queries and their individual predictions can also be used to predict multi-query workload performance.

Exemplary embodiments uses one or more machine learning techniques (MLT) to derive a prediction model for each system configuration from benchmark queries and then make predictions based on the measured performance metrics of previously run queries and workloads. Rather than explicitly modeling hardware performance, one embodiment uses a machine learning technique or algorithm to find correlations between the query plan properties and query performance metrics on a training set of queries and then use these correlations to predict the performance of new queries.

Exemplary embodiments are applicable to any database system and configuration using a variety of workloads and datasets. Further, exemplary embodiments are applicable to a wide range of query sizes (execution times that span milliseconds to hours or longer). Further, many data warehouse vendors support a small set of fixed hardware configurations (e.g.; fixed amount of memory per CPU or few choices for the number of CPUs). Since performance varies dramatically from one configuration to another, one embodiment trains and predicts on a separate model for each supported hardware configuration. Predicted performance is then compared for each configuration to determine the optimal system size for a given customer workload. Thus, exemplary embodiments characterize the workload and the system performance simultaneously. This characterization produces a detailed picture of both the queries that make up the workload as well as numerous system performance metrics.

One embodiment uses machine learning techniques to first derive a model based on a training set of previously executed data points (queries) and their measured performance. The technique then predicts performance for unknown ("test") data points based on this model. Exemplary embodiments then capture the interdependencies among multiple performance metrics and predict them simultaneously using a single model. One embodiment uses a Kernel Canonical Correlation Analysis (KCCA) as the machine learning technique.

In one embodiment, the machine learning technique predicts query and workload performance. In order to map performance prediction onto the data structures and functions used by the machine learning technique, several issues are explained. First, how exemplary embodiments represent the information about each query available before running it as a vector of "query plan features" and the performance metrics available after running it as a vector of "query performance features." This explanation is provided in the discussion of FIG. 1. Second, how exemplary embodiments define the similarity between any pair of query plan vectors and any pair of query performance vectors (i.e., define the kernel functions). This explanation is provided in the discussion of FIG. 2. Third, how exemplary embodiments use the output of the machine learning technique to predict the performance of new queries. This explanation is provided in the discussion of FIG. 3.

Figure 1:
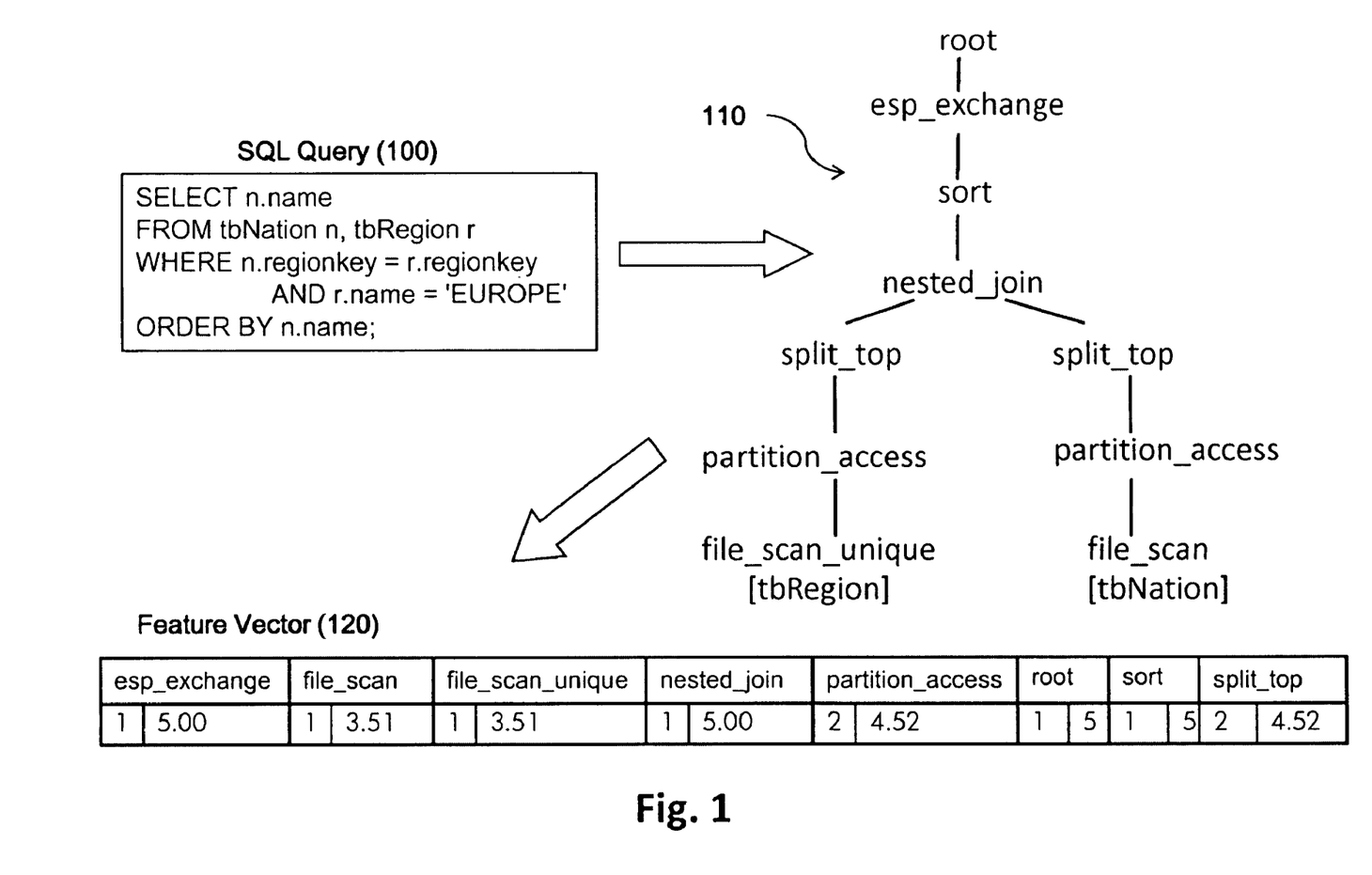
FIG. 1 is a diagram showing each query as a vector in accordance with an exemplary embodiment of the present invention.

FIG. 1 is a diagram showing each query as a vector in accordance with an exemplary embodiment of the present invention.

Before running a query 100 (such as an SQL query), the database query optimizer produces or generates a query plan 110 that includes a tree of query operators with estimated cardinalities. This query plan 110 creates a query plan feature vector 120. While an embodiment could use just the query text, two textually similar queries could have dramatically different plans and performance due to different selection predicate constants. The query optimizer's plan, which is produced in milliseconds or seconds, is more indicative of performance and not process intensive to obtain.

The query plan feature vector 120 includes an instance count and cardinality sum for each possible operator. For example, if a sort operator appears twice in a query plan with cardinalities 3000 and 45000, the query plan vector includes a "sort instance count" field containing the value 2 and a "sort cardinality sum" field containing the value 48000. The cardinality sum is the number of rows that the query optimizer predicts will be needed to satisfy the query. FIG. 1 shows the number of instances of the operator in the query (for example, shown as 1 under esp_exchange and 1 under file_scan) and shows the sum of cardinalities for each instance of the operator (for example, shown as 5.00 for esp_exchange and 3.51 for file_scan).

FIG. 1 shows the query plan 110 and resulting feature vector 120 for a simple query (although it omits operators whose count is 0 for simplicity). The intuition behind this representation is that each operator "bottlenecks" on some particular system resource (e.g. CPU or memory) and the cardinality information encapsulates roughly how much of the resource is expected to be consumed. Other features can also be included, such as an indication of tree depth and bushiness.

In one embodiment, a query performance vector is created from the performance metrics that the database system collects when running the query. By way of illustration, such metrics include elapsed time, disk I/Os, message count, message bytes, records accessed (the input cardinality of the file scan operator) and records used (the output cardinality of the file scan operator). In this example, the performance vector would have six elements.

Figure 2:
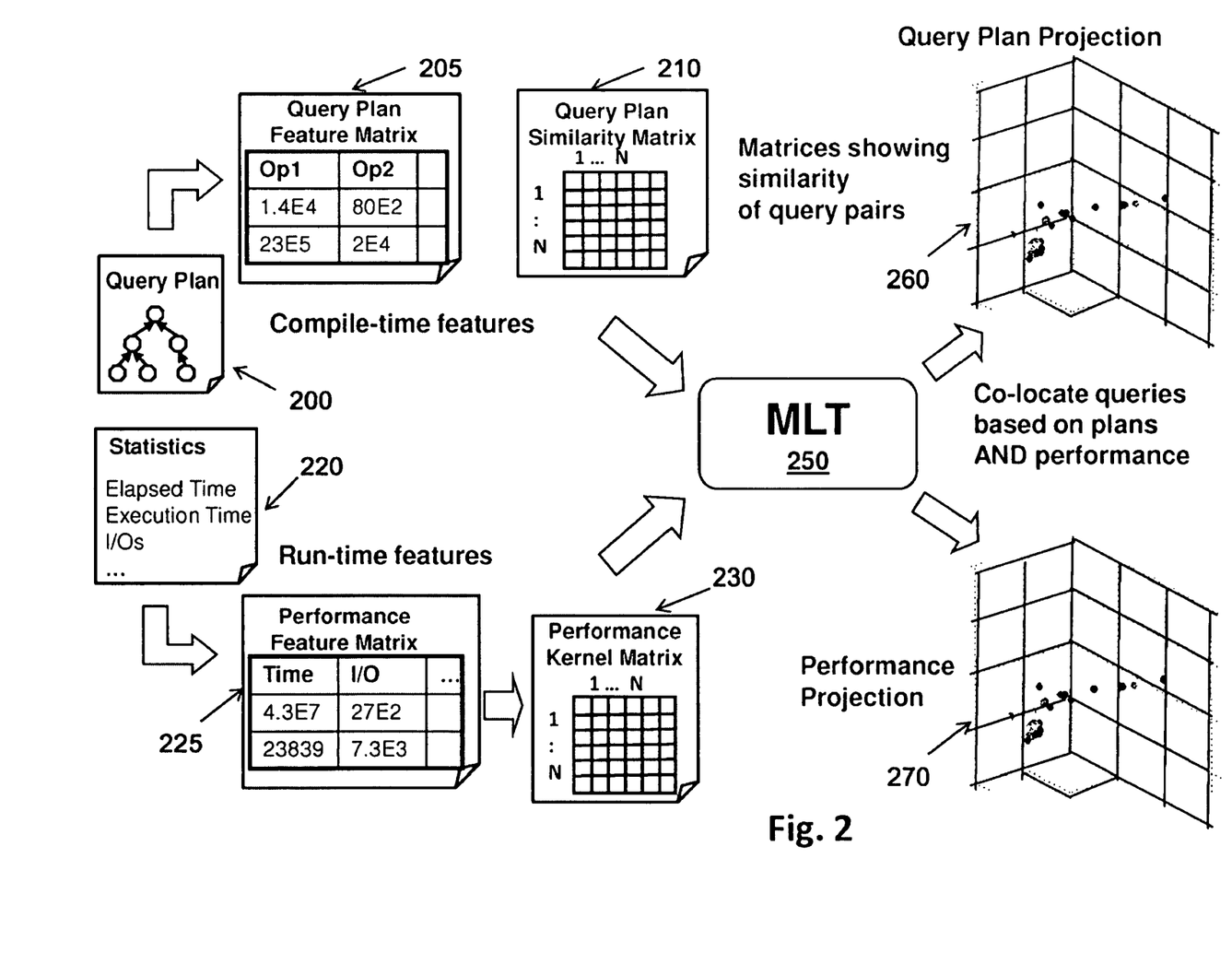
FIG. 2 is a diagram of a system using a machine learning technique in accordance with an exemplary embodiment of the present invention.

Second, as discussed, exemplary embodiments also define the similarity between any pair of query plan vectors and any pair of query performance vectors (i.e., define the kernel functions). As shown in FIG. 2, a query plan 200 is used to develop or compute a query plan feature matrix 205 and a query plan similarity matrix 210. Further, statistics 220 (such as elapsed time, memory usage characteristics, execution time, I/Os, etc.) are used to develop or compute a performance feature matrix 225 and a performance kernel matrix 230. The query plan similarity matrix 210 and the performance kernel matrix 230 are input into the machine learning algorithm or technique 250 which generates a query projection plan 260 and a performance projection 270.

In one embodiment, the machine learning technique 250 uses a kernel function to compute "distance metrics" between any two query plan vectors and any two query performance vectors. By way of example, one embodiment uses a Gaussian kernel that assumes only the raw feature values follow a simple Gaussian distribution. The variance in a Gaussian distribution is the standard deviation squared for these values. For example, given N queries, form an N×N matrix L where $L(i, j)$ is the computed similarity between query plan vectors i and j. The query plan kernel matrix is lower-triangular and similarity is normalized to 1, i.e. $L(i, j)=1$ if $i=j$. The N×N matrix P of similarity is computed between each pair of query performance vectors (for example, 6-dimensional vectors for the example provided above).

The machine learning technique 250 clusters queries with similar query plan feature vectors and similar performance features vectors. Given matrices L and P of dimension N×N, the machine learning technique finds subspaces of a dimension D<N (D is chosen by the machine learning technique) onto which each can be projected, such that the two sets of projections are maximally correlated. This corresponds to solving a generalized eigenvector problem as shown in FIG. 2. More concretely, the machine learning technique produces a matrix A consisting of the basis vectors of a subspace onto which L is projected (giving L×A), and a matrix B consisting of basis vectors of a subspace onto which P is projected, such that L×A and P×B are maximally correlated.

Figure 3:
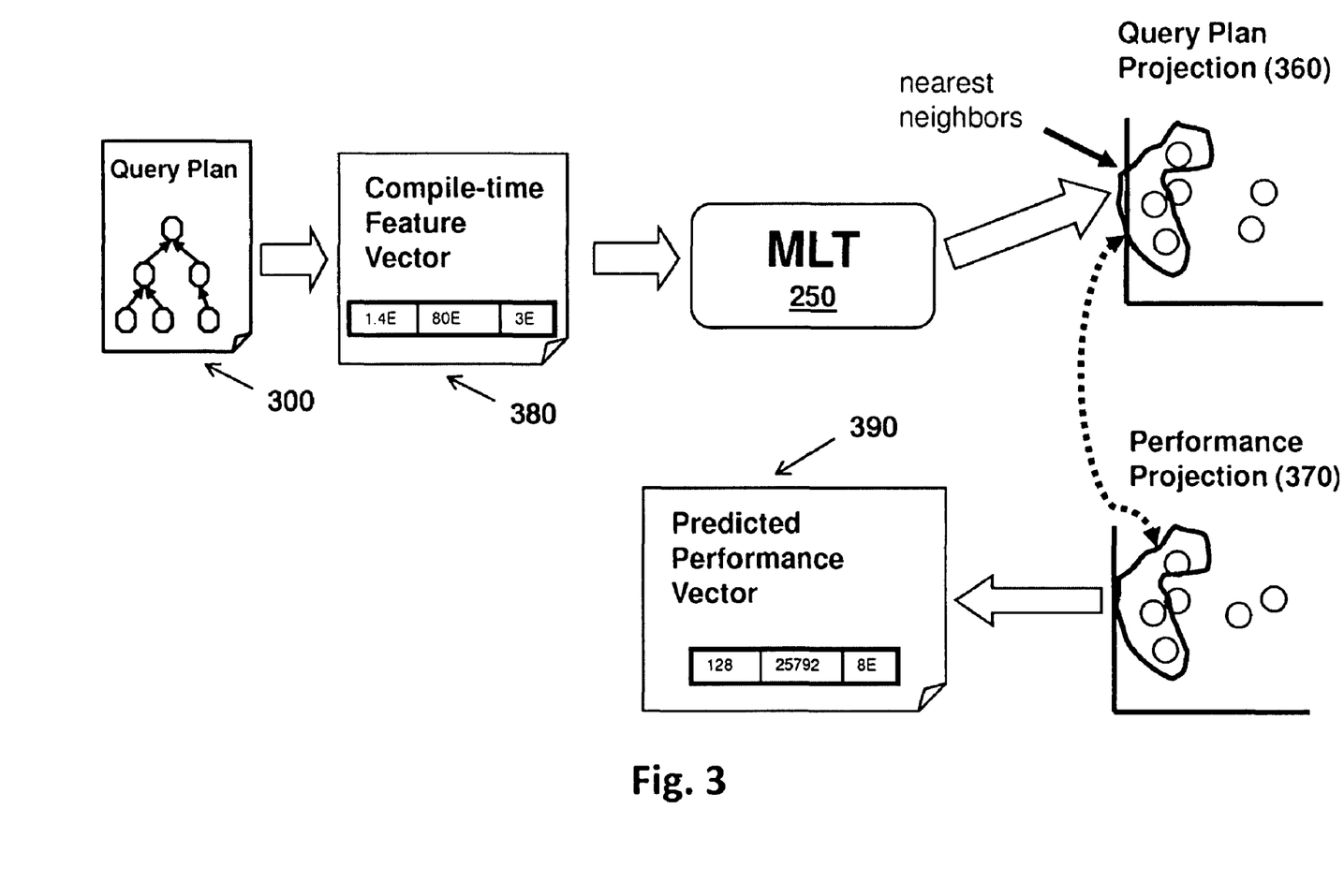
FIG. 3 is a diagram of a system showing prediction through the machine learning technique in accordance with an exemplary embodiment of the present invention.

Third, as discussed, exemplary embodiments also use the output of the machine learning technique to predict the performance of new queries. FIG. 3 is a diagram of a system showing prediction through the machine learning technique in accordance with an exemplary embodiment of the present invention. As shown, the query plan 300 and compile time feature vector 380 are input into the machine learning technique 250 which generates the query plan projection 360 and the performance projection 370. The machine learning technique 350 projects a new query plan vector and then uses nearest neighbors to find the corresponding location on the query performance projection 370 to derive the new query's predicted performance vector 390 from those nearest neighbors.

In one embodiment, predicting the performance of a new query involves three steps. First, exemplary embodiments create its query plan feature vector and identify its coordinates on MLT's query plan projection L×A. Then the k nearest neighbors in the projection (using any one of a number of methods to calculate distance, such as Euclidean distance or cosine distance) are found from among the known queries. By way of illustration, embodiment use k=3, 4, or 5. Then, the positions of the k nearest neighbors are compared in the performance metric feature space to those of the points located around them. If there is a point P in the performance metric feature space that is closer to each of the k nearest neighbors than they are to each other, then this point P is looked up in the map between performance metric input vectors and the performance metric feature space, and the corresponding performance metric input vector is used to produce estimated performance metrics for the new query.

Figure 4:
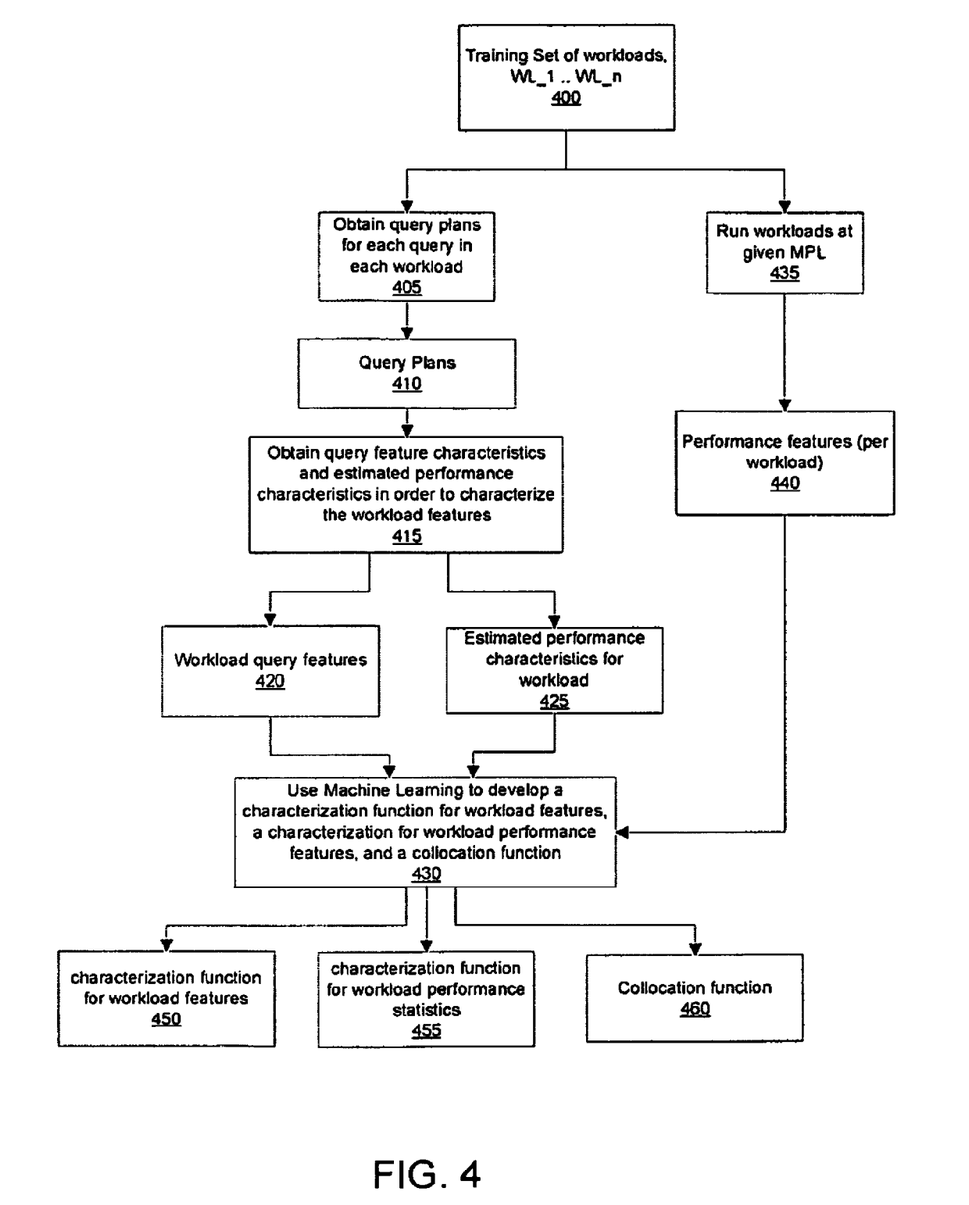
FIG. 4 is a flow chart of a training phase for a machine learning technique in accordance with an exemplary embodiment of the present invention.

FIG. 4 is a flow chart of an exemplary usage of a system predicting performance of multiple queries executing in a database in accordance with an exemplary embodiment of the present invention.

According to block 400 one or more training sets of representative workloads are obtained and/or identified (for example, a training set of workloads: WL_1, WL_2, . . . WL_n). The data necessary to execute the queries of the workloads is loaded onto the database system configuration.

According to block 405, the query plans (shown in block 410) for each query in each workload is obtained. For each workload in the training set, one embodiment collects the workload's queries' execution plans as well as the performance results of running the queries in isolation on the database system configuration.

According to block 435, the workloads are run or executed at given Multi-Programming, Levels (MPLs). The MPLs represent how many queries are simultaneously being executed. If too many queries are simultaneously run, then contention for system resources can degrade system performance. The output from block 435 includes the performance features per workload (shown in block 440), and this data is input in to the machine learning algorithm (shown in block 430).

One embodiment collects performance results for running each query in isolation in the database system. Exemplary embodiments then encode the information in each query's execution plan as a "compile-time feature vector." This feature vector describes the query and contains, for example, counts and cardinalities for each operator of the query's execution plan. A similar performance metrics feature vector is generated for the performance metrics for running each training query in isolation in the database system.

Another embodiment collects performance results for running each workload in its entirety in the database system. Exemplary embodiments then encode the information in each workload's queries' execution plans as a "compile-time feature vector." This feature vector describes the workload and contains, for example, counts and cardinality estimates for each operator. An alternative "compile-time feature vector" would include not only the counts and cardinality estimates for the various operators of the workloads' queries, but also the predicted performance metrics features vectors associated with each query. A similar performance metrics feature vector is generated for the performance metrics for each workload. One embodiment derives a workload's feature vector based on the workload's queries' feature vectors and queries' predicted performance metric vectors.

Thus, according to block 415, embodiments obtain query feature characteristics and estimated performance characteristics in order to characterize workload features. The workload query features (shown in block 420) and the estimated performance characteristics for the workload (shown in block 425) are input into the machine learning algorithm (shown in block 430).

According to block 430, an exemplary embodiment uses machine learning (ML) or a machine learning algorithm (MLA) to develop a characterization function for workload features (shown as output in block 450) and a characterization function for a workload's performance results (shown as output in block 455) in such a way that the similarity between any two workloads' features correlates to the similarity between those same two workloads' performance characteristics. By way of example, this step (in a simple embodiment) produces two maps. One map locates workloads according to their query feature characteristics, and another map locates queries according to their performance characteristics in such a way that two workloads that are co-located on one map will also be co-located on the other map.

One embodiment creates a collocation function (shown as output in block 460) between workload feature characteristics and performance characteristics so that given a location on one map a corresponding location on the other map can be determined.

Given a new workload, one embodiment uses the workload feature characterization function to characterize the new features of the workload and locates it on the workload feature characterization map. The collocation function is used to identify the corresponding location on the performance characteristics map.

As shown in FIG. 4, the machine learning algorithm outputs the characterization function for workload features 450 and the characterization function for workload performance statistics 455.

To develop the characterization functions, exemplary embodiments use a machine learning algorithm (for example, a Kernel Canonical Correlation Analysis: KCCA) with the following procedure.

First, the procedure takes as input a set of vectors representing the workload features and a set of vectors representing the performance metrics. Next, it imposes a notion of "similarity" between two workloads using kernel functions. The procedure performs an equivalent step for comparing performance metrics. The result of this step produces matrices which encode the similarity of each workload in the training set with every other workload in the training set (and similarly for the performance metrics). Next, the procedure uses canonical correlation analysis to identify the dimensions of maximal correlation between the workload features and the performance metrics. The training set data is projected onto these dimensions to generate the maps as previously described. Next, given a new workload, the procedure determines its position on the workload feature map, identifies its nearest neighbors on tile map (using one of any number of measures of distance, for example Euclidean distance or cosine distance), and retrieves the corresponding neighbors on the performance characteristics map to calculate the new workload's performance predictions. For example, an exemplary embodiment can use a simple collocation function that would do something like average tile performance metric measurements of the nearest neighbors to produce an estimate of performance metrics for the new point.

Machine learning techniques enable exemplary embodiments to recognize patterns in data and extract significant features within a large amount of data. Trained learning machine algorithms are used to predict the outcome in databases when the outcome is not known (for example, before the query is executed or run).

Exemplary embodiments also utilize kernel methods that are based on statistical learning theory. In general, kernel algorithms (such as kernel Gram-Schmidt, Bayes point machines, and Gaussian processes) utilize kernels for problems of classification, regression, density estimation and clustering. Kernel methods map data into a high dimensional feature space and then apply any one of various algorithms adapted for work in conjunction with the kernels in other words, the kernel virtually maps data into a feature space so that the relative positions of the data in feature space can be used to evaluate and/or classify the data.

One embodiment uses kernel methods to generate information about similarity between data points. The word "similarity" is defined as the inner product between two points in a suitable feature space. The mapping into feature space is achieved in an implicit way: the algorithms are rewritten to need only inner product information between input points. The inner product is then replaced with a generalized inner product, or "kernel function." This kernel function returns the value of an inner product between feature vectors representing images of the inputs in some feature space.

Figure 5:
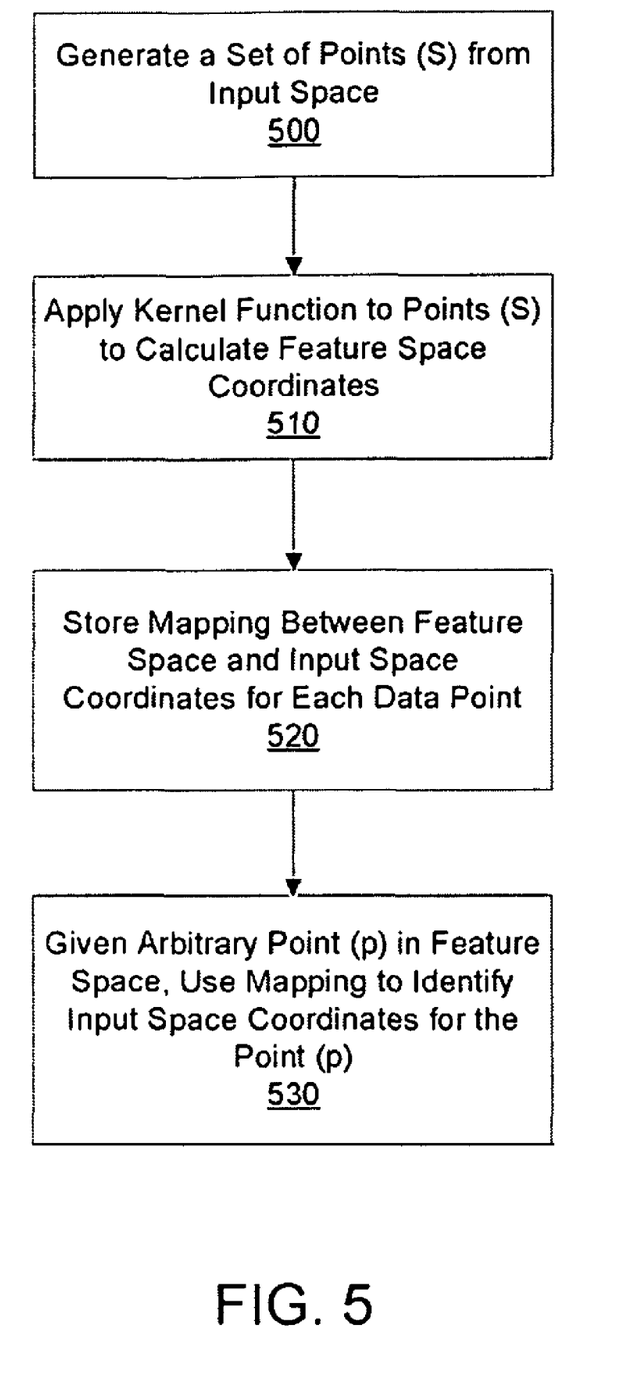
FIG. 5 is a flow chart of a method for using a kernel function to calculate feature space coordinates in accordance with an exemplary embodiment of the present invention.

FIG. 5 is a flow chart of a method for using a kernel function to calculate feature space coordinates in accordance with an exemplary embodiment of the present invention.

According to block 500, a set of Performance Metric Feature Vectors (V) is generated. By way of example, this set of points (V) includes a complete set of points in the performance metrics input space when then performance metrics input space is finite or small. Alternatively, the set of vectors includes performance metric inputs that are expected or predicted to appear in the performance metrics input space.

According to block 510, a kernel function is applied to the set of points (V). This kernel function calculates the feature space coordinates for the points and generates (S).

According to block 520, a mapping (M) is stored between the feature space coordinates and the input space coordinates. The mapping is stored for each data point.

According to block 530, the mapping is used to identify the input space coordinates given an arbitrary point (p) in the feature space. In other words, a mapping occurs from coordinates in the feature space S' to points in the input space S. By way of example, if a point p already exists in S', then one embodiment performs a reverse lookup using M to a point in S. If the point p does not exist in S, then embodiments discover or locate a point p' that is "nearest" to point p and then perform a reverse lookup using M to a point in S.

Figure 6:
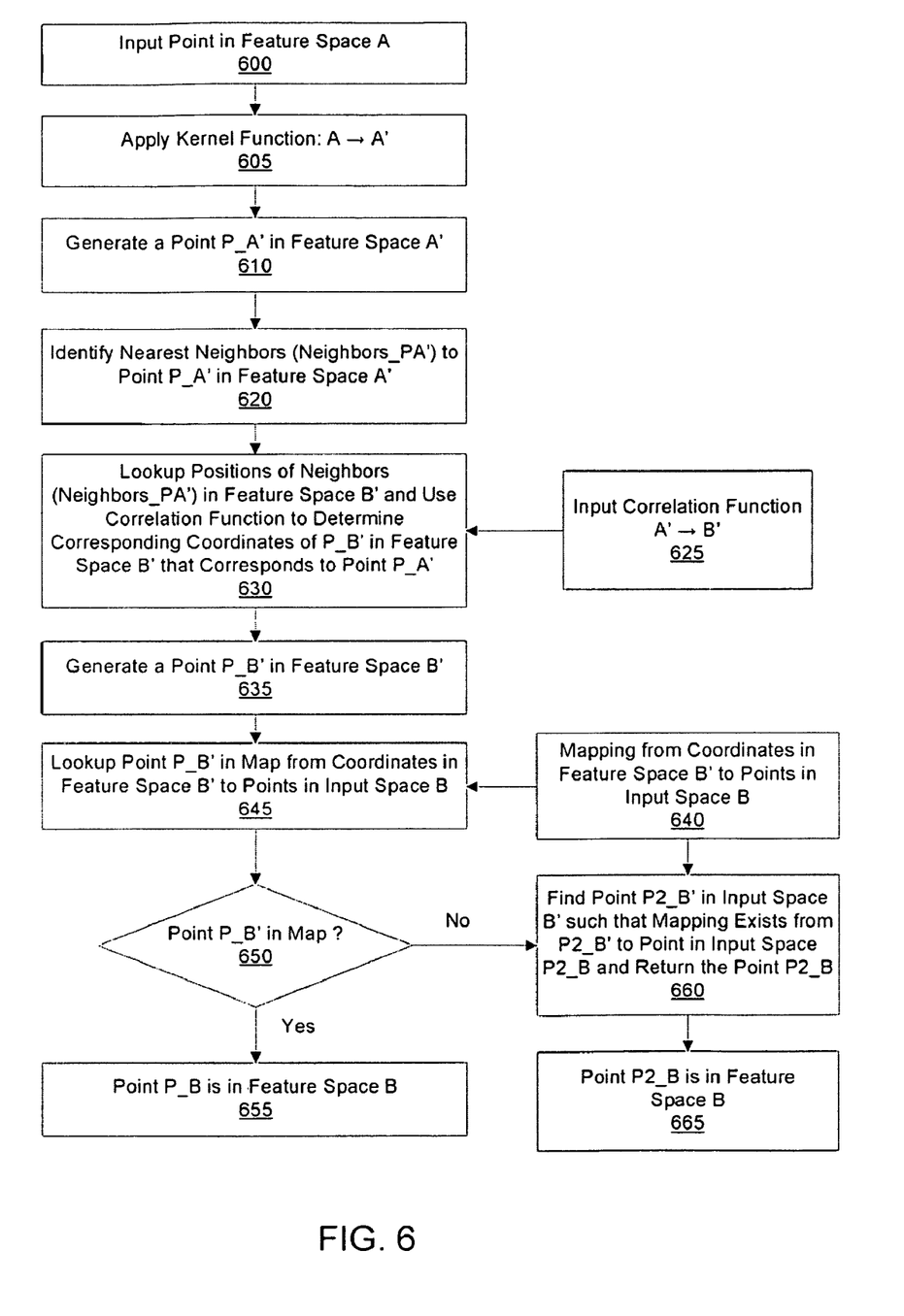
FIG. 6 is a flow chart of a method for performing a reverse mapping from a target feature space to a target input space in accordance with an exemplary embodiment of the present invention.

FIG. 6 is a flow chart of a method for performing a reverse mapping from a target feature space to a target input space in accordance with an exemplary embodiment of the present invention.

According to block 600, a point is input into feature space A, and a kernel function is applied to the point according to block 605 such that A→A'.

According to block 610, point P_A' is generated in feature space A'. Next, nearest neighbors (Neighbors_PA') are generated for point P_A' in feature space A' according to block 620.

The correlation function (A'_B') is input according to block 625. Then, according to block 630, a lookup is performed of the positions of neighbors (Neighbors_PA') in feature space B'. The correlation function is used to determine or calculate corresponding coordinates P_B' in feature space B that corresponds to point P_A'. Point P_B' in feature space B' is generated or discovered according to block 635.

According to block 640, a mapping from coordinates in feature space B' is input or provided to points in input space B. Then, the method performs a lookup of point P_B' in the map from coordinates in feature space B' to points in input space B according to block 645.

According to block 650, a question is asked whether the point P_B is located in the map. If the answer to this question is "yes" then point P_B is located in feature space B according to block 655.

If the answer to this question is "no" then flow proceeds to block 660. Here, the method finds point P2_B' in input space B' such that mapping exits from P2_B' to point in input space P2_B and returns the point P2_B. Then according to block 665, the point P2_B is located in feature space B.

In the absences of a system with bounded performance metrics different statistical techniques can be used to perform the reverse mapping. By way of example, one embodiment performs regression on a known set of feature space vectors to identify parameters to predict their corresponding target input space vectors. Another embodiment could theoretically reverse the transformation from input space to feature space. Furthermore, another embodiment can perform clustering (such as k-means or agglomerative clustering) in the feature space to impose boundaries for grouping similar points on tile space. Ranges are calculated for each vector element in the input space that defines these clusters of the corresponding points in the feature space. As a result, the reverse mapping produces a range of possible values for the target input vector rather than a single value for each component of the vector.

Kernel methods map observations from an input space to a higher-dimensional feature space via some non-linear map. These methods then apply a linear method and create a linear classification in the feature space equivalent to a non-linear classification in the original space. Performing a reverse mapping from the feature space back to the input space, however, is difficult because of the complexity of the mapping algorithm combined with the fact that the dimensionality of the feature space can be much higher or lower than the input space (based oil the goal of the transformation function). In a systems context, the reverse mapping from the feature space to input space enables performance prediction and identifies meaningful relationships in the raw data. One embodiment synthetically populates the feature space with all possible points from the input space since a finite set of quantifiable system behavior exists.

Figure 7:
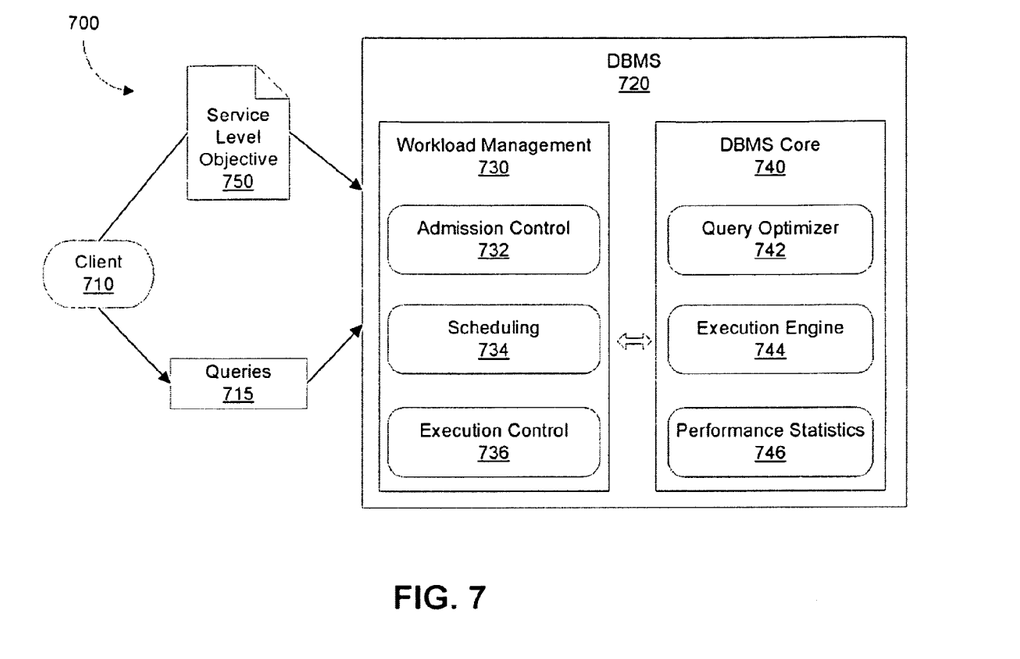
FIG. 7 is a block diagram of an exemplary database system in accordance with an embodiment of the present invention.

FIG. 7 is a database system 700 for managing the execution of database queries in accordance with an exemplary embodiment of the present invention. The system generally includes a computer or client 710 that sends queries 715 to a Database Management System (DBMS) 720 which includes a workload management component 730 and a DBMS core 740. The workload management component includes plural components or modules as admission control 732, scheduling 734, and execution control 736. The DBMS core 740 includes plural components or modules as a query optimizer 742, an execution engine 744, and performance statistics 746. Further, Service Level Objectives (SLOs) 750 are coupled between the client 710 and the DBMS 720.

The workload management architecture 730 provides fundamental workload management functionality for admission control, scheduling, and execution control. The DBMS core 740 provides core database functionality and supply information to workload management components but does not implement workload management policies. Each job consists of an ordered set of typed queries 715 submitted by a computer or client 710, and is associated with one or more Service Level Objectives (SLOs).

Figure 8:
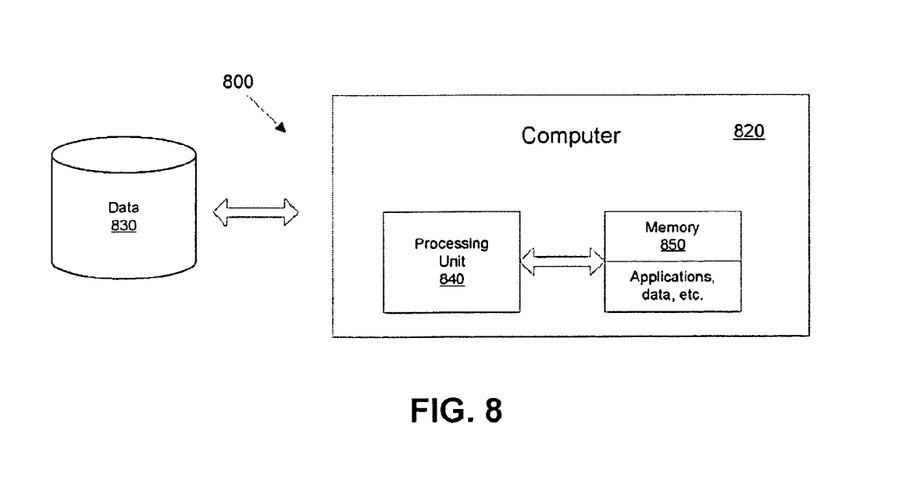
FIG. 8 is a block diagram of an exemplary computer system in accordance with an embodiment of the present invention.

Embodiments in accordance with the present invention are utilized in or include a variety of systems, methods, and apparatus. FIG. 8 illustrates an exemplary embodiment as a computer system 800 for being or utilizing one or more of the computers, methods, flow diagrams and/or aspects of exemplary embodiments in accordance with the present invention.

The system 800 includes a computer 820 (such as a host or client computer) and a repository, warehouse, or database 830. The computer 820 comprises a processing unit 840 (such as one or more processors or central processing units, CPUs) for controlling the overall operation of memory 850 (such as random access memory (RAM) for temporary data storage and read only memory (ROM) for permanent data storage). The memory 850, for example, stores applications, data, control programs, algorithms (including diagrams and methods discussed herein), and other data associated with the computer system 820. The processing unit 840 communicates with memory 850 and data base 830 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed Computing devices, laptops, and other electronic devices and systems whether such devices and systems are portable or non-portable.

Execution time can vary significantly depending on the resource needs of the query and the resource needs of the other queries being executed at the same time. By explicitly predicting and modeling the resource needs of the queries that make up the workload, exemplary embodiments provide a more complete characterization of how the various queries in a given workload interact and thus provide more accurate predictions of the workload's performance characteristics. Exemplary embodiments also includes methods to build a model of how to characterize the queries in the training set so as to create clusters of queries that will be likely to exhibit similar performance characteristics.

With exemplary embodiments, users (such as DBAs and database designers) can predict the time needed to execute one or more queries (i.e., a workload). Exemplary embodiments use machine learning to discover simultaneously (1) a characterization function for characterizing the similarity between workloads as well as (2) a characterization function for characterizing similar performance of workloads, and (3) a mapping function between the resulting workload characteristics and the resulting performance characteristics. Exemplary embodiments provide methods and systems to predict in advance the performance characteristics (for example, execution time, resource usage, resource contention, etc.) of executing multiple queries in a large scale BI database.

Exemplary embodiments are applicable for addressing various business needs, and some examples are provided as follows. As one example, embodiments are used to respond to a customer challenge workload: Selecting a database system configuration for running a "challenge" workload given by a customer that falls within the customer's price range yet is capable of executing the workload with at least acceptable performance. As another example, embodiments are used for sizing a database: Selecting a database system configuration to sell to a customer. The system executes the customer's business workload with at least acceptable performance, yet designs a system to be priced within the customer's budget. As yet another example, embodiments consider capacity Planning: Given a current customer who has a business workload that they are running on a given database system configuration, embodiments predict what would happen if the characteristics of the database system configuration were changed (e.g., scaled up or scaled down) or if the customer's workload were to change (e.g., if the customer were to scale up, scale down, or change the nature/distribution of their workload), or if both the database system configuration and the customer's workload were to change. As another example, embodiments are used for workload management: Given a workload and a database system configuration, select admission control, scheduling, and execution management policies that enable the workload to be executed on the database system configuration with good performance characteristics. As yet another example, embodiments are used for multi-Query optimization: Given a workload and a database system configuration, embodiments characterize how queries will interact when executing simultaneously and improve the performance of executing the workload on the database system configuration. As yet another example, embodiments provide progress indication: Given a currently executing query, embodiments determine its degree of completion and/or rate of progress and can provide this information to a user.

Definitions

As used herein and in the claims, the following words have the following definitions:

The terms "automated" or "automatically" (and like variations thereof) mean controlled operation of an apparatus, system, and/or process using computers and/or mechanical/electrical devices without the necessity of human intervention, observation, effort and/or decision.

A "database" is a structured collection of records or data that are stored in a computer system so that a computer program or person using a query language can consult it to retrieve records and/or answer queries. Records retrieved in response to queries provide information used to make decisions. Further, the actual collection of records is the database, whereas the DBMS is the software that manages the database.

A "database administrator" or "DBA" is a person who defines or manages a database or controls access to the database.

A "database management system" or "DBMS" is computer software designed to manage databases.

The term "execution time" means the amount of time the processor or CPU is actually executing instructions. During the execution of most programs, the CPU sits idle much of the time while the computer performs other tasks, such as fetching data from the keyboard or disk; or sending data to an output device. The execution time is, therefore, generally less than the wall-clock time (i.e., the actual time as measured by a clock that the query has been running) and includes the time a query is executing in the database and not the time waiting in a queue.

Given an input data set consisting of some number of vectors, the term "input space" means the space of all possible input vectors. For example, if the elements of the vectors are real numbers, then the input space is $R^n$, corresponding to points in an n-dimensional real space.

Given an input data consisting of some number of vectors, the term "feature space" means the space to which all possible input vectors could be mapped. The feature space could have the same dimension as the input space or the dimensionality could be less.

The term "machine learning" means the design and development of algorithms and/or techniques that allow computers to use inductive learning methods to extract rules and/or patterns out of large data sets.

The term "Service Level Objective" or "SLO" is a key element of a Service Level Agreement (SLA) between a Service Provider and a customer. SLOs are agreed as a means of measuring the performance of the Service Provider and are outlined as a way of avoiding disputes between the two parties based on misunderstanding. The SLA is the contract or agreement that specifies what service is to be provided, how it is supported, times, locations, costs, performance, and responsibilities of the parties involved. SLOs are specific measurable characteristics of the SLA such as availability, throughput, frequency, response time, or quality. Further, the SLOs can include one or more quality-of-Service (QoS) measurements that are combined to produce the SLO achievement value.

A "workload" is a set of queries used for the data warehouse.

In one exemplary embodiment, one or more blocks or steps discussed herein are automated. In other words, apparatus, systems, and methods occur automatically.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also refilled to as code subroutines, or "objects" in object-oriented programming). The location of the software will differ for tile various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
generating, by the computer, performance characteristic metric vectors representing query execution metrics for a database;
given a point in a feature input space that corresponds to a first one of the performance characteristic metric vectors, identifying, by the computer, nearest neighbors of the point and corresponding points in a performance metric feature space;
determining, by the computer, a generated point that represents a cluster represented by the corresponding points; and
using, by the computer, the performance characteristic metric vectors that correspond to the generated point to predict performance of a query on a first database system having a first configuration of hardware and software and on a second database system having a second configuration of hardware and software, prediction occurring before the query executes on the first database system and before the query executes on the second database system, the second configuration being different than the first configuration.

2. The method of claim 1, wherein the generated point represents a center of the cluster.

3. The method of claim 1, further comprising storing a map mapping the performance characteristics metric vectors from an input space to a feature space.

4. The method of claim 1, further comprising using a kernel function to map the performance characteristics metric vectors from an input space to a feature space.

5. The method of claim 1, further comprising populating a feature space with a set of likely points from an input space.

6. The method of claim 1, further comprising performing a reverse mapping to identify coordinates in an input space to predict performance of the query.

7. A tangible computer readable storage disc or device comprising instructions which, when executed, cause a computer to at least:
obtain points for an input space for queries for a database;
map the points from the input space to a feature space; and
given locations in the feature space, use reverse mapping to identify corresponding locations in the input space for the locations in the feature space to predict execution performance of queries on a first database system having a first configuration of hardware and software and on a second database system having a second configuration of hardware and software, prediction occurring before the queries execute on the first database system and before the query executes on the second database system, the second configuration being different than the first configuration.

8. The tangible computer readable storage disc or device of claim 7, wherein the instructions cause the computer to perform the reverse mapping by performing regression on a known set of vectors in the feature space to identify parameters that predict corresponding vectors in the input space.

9. The tangible computer readable storage disc or device of claim 7, further comprising instructions which, when executed, cause the computer to at least:
impose boundaries for grouping similar points in the feature space; and
calculate ranges for vectors in the input space that define clusters of corresponding points in the feature space to generate a range of possible values.

10. The tangible computer readable storage disc or device of claim 7, further comprising instructions which, when executed, cause the computer to at least:
apply a correlation function to the feature space to generate a second feature space;
identify nearest neighbors to a point in the feature space; and
use the correlation function to identify nearest neighbors in the second feature space that correspond to the nearest neighbors in the feature space.

11. The tangible computer readable storage disc or device of claim 7, further comprising instructions which, when executed, cause the machine to at least store a map generated by the kernel function to map the points from the input space to the feature space.

12. A computer system, comprising:
a database;
a memory; and
a processor programmed to:
generate points from an input space obtained from a query for a database;
map the points from the input space to a feature space;
given a point in the feature space, perform a reverse mapping to identify coordinates in the input space for the point;
predict performance of the query on a first database system having a first configuration of hardware and software before the query is executed on the first database system; and
predict performance of the query on a second database system having a second configuration of hardware and software before the query is executed on the second database system, the second configuration being different than the first configuration.

13. The computer system of claim 12, wherein the processor is programmed to determine a nearest point in the input space when the point in the feature space does not exist in the input space.

14. The computer system of claim 12, wherein the processor is programmed to populate the feature space with all possible points from the input space.

* * * * *